United States Patent

[11] 3,558,848

| [72] | Inventor | Robert B. Width |
| | | Rochester, Mich. |
| [21] | Appl. No. | 734,471 |
| [22] | Filed | June 4, 1968 |
| [45] | Patented | Jan. 26, 1971 |
| [73] | Assignee | Tuffaloy Products, Inc. |
| | | Detroit, Mich. |
| | | a corporation of Michigan |

[54] ELECTRIC RESISTANCE WELDING ELECTRODE HOLDER THREE ELECTRODES IN BALANCED FORCE CONTACT
1 Claim, 6 Drawing Figs.

[52] U.S. Cl. .................................... 219/87,
219/119, 219/120
[51] Int. Cl. .................................... B23k 11/10,
B23k 11/30
[50] Field of Search ........................... 219/161,
138, 87, 86, 120, 119, 78

[56] References Cited
UNITED STATES PATENTS
2,979,599   4/1961   Width ........................... 219/161X Primary Examiner—A. Bartis
Assistant Examiner—Hugh D. Jaeger
Attorney—William T. Sevald ABSTRACT: An electric resistance welding electrode holder for holding three electrodes against a workpiece in substantially equal engagement to make substantially equal welds. Retractable pistons support the electrodes and are moved into the holder body by electrode engagement with the workpiece in the advancement of the holder. The pistons have cam surfaces at their inner ends coacting with a common intermediate cam. Different distances of retracting or axial inward movement of the pistons is compensated by the cam shifting transversely and making engagement at different rise points on the cam surfaces of the pistons. The cam locks the pistons in their self-adjusted position and further advancement of the holder forces the electrodes into substantially equal mechanical engagement and electrical contact with the workpiece to make substantially equal welds. The holder has coolant circulation means leading through the common cam chamber communicating with the electrodes and circulation means leasing around the common cam chamber communicating with the electrodes.

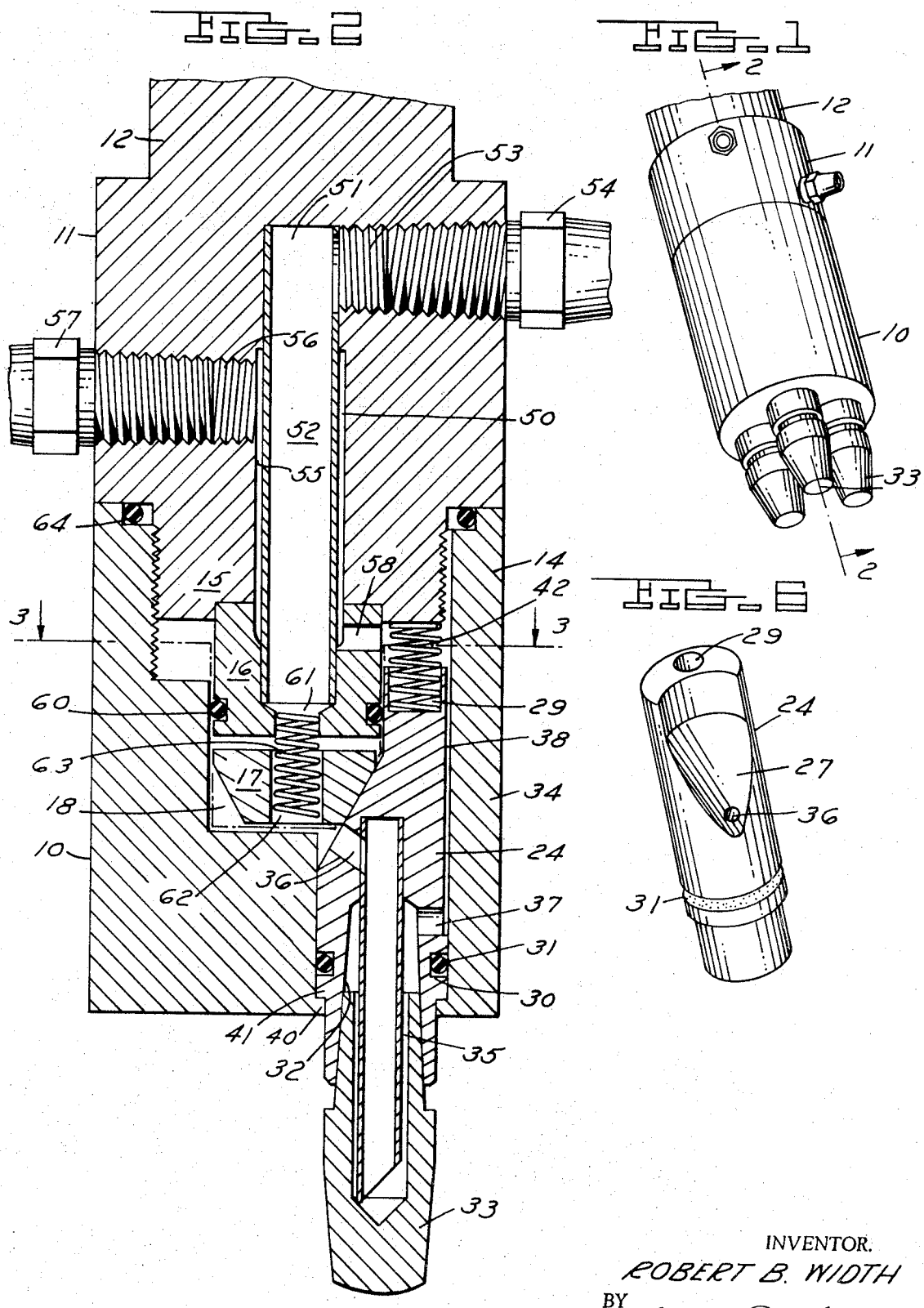

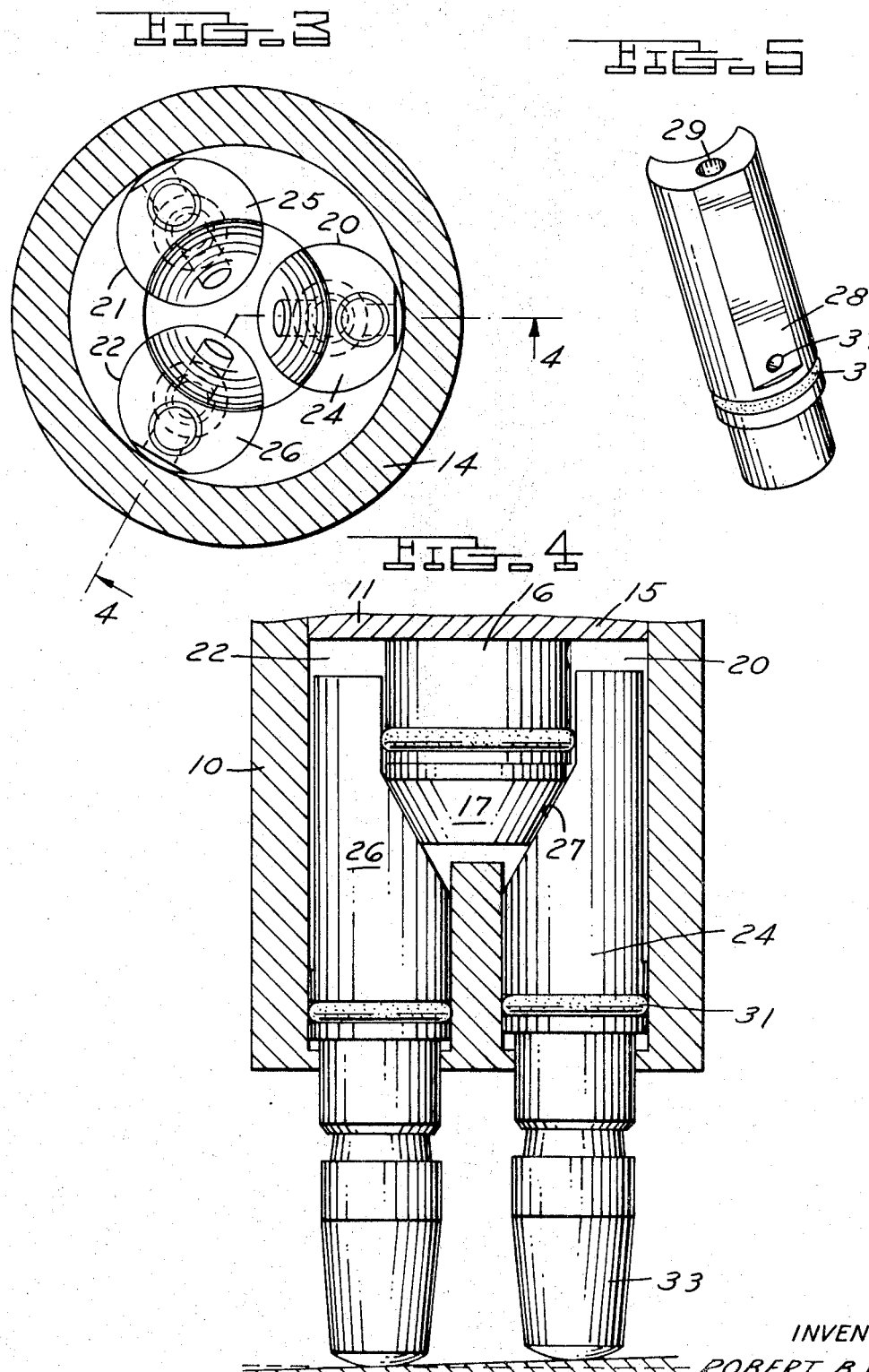

ELECTRIC RESISTANCE WELDING ELECTRODE HOLDER THREE ELECTRODES IN BALANCED FORCE CONTACT

This invention relates to electric resistance welding electrode holders and in particular to a holder which is capable of holding and adjusting three electrodes in substantially equal mechanical engagement and electrical contact to make substantially equal welds.

When three electrodes on the same holder are used to make three welds at the same time, they must be pressed into substantially equal electric contact with the workpiece and the opposing base electrode or one electrode passes too much current and the others pass too little current resulting in extreme instances of burning out one weld and failing to make the others. Since the electric current follows the best conduction path, the electrical contact of each electrode is critical. As the equality of the electrical contact depends on the quality of the mechanical engagement of three electrodes on a single holder, the equality of the mechanical engagement is critical.

The variables involved include the difference in the thickness of workpieces, misalignment of tools, over and under seating of electrodes in the holder, difference in electrode length, mushrooming and other wear on electrodes, bends in workpieces, and unevenness of the base electrode, inter alia. These differences need only be minute to greatly change the conductivity of the electrodes relative to one another.

With the foregoing in view, it is a primary object of the invention to provide a variable condition equalizing and compensating holder for holding three electrodes in substantially equal mechanical engagement with the workpiece, to effect substantially equal electrical contact, to pass substantially equal welding current, to make substantially equal welds.

An object of the invention is to provide a very compact compensating holder so that little space is used and so that the electrodes may be located close to one another if desired.

An object of the invention is to provide a holder which jams its moving compensating parts in solid electrical contact with one another prior to conducting welding current.

An object of the invention is to provide a holder which unjams after the welds are made so as to have its compensating parts readily adjustably movable for making the next welds.

An object of the invention is to provide coolant circulation means associated with the novel structure.

An object of the invention is to provide a very simple mechanism to obviate current conducting problems.

These and other objects of the invention will become apparent by reference of the following description of an equalizing and compensating triple welding electrode holder embodying the invention taken in connection with the accompanying drawings, in which:

FIG. 1 is a reduced side and bottom perspective view of a triple electrode holder embodying the invention with the shank portion broken away.

FIG. 2 is an enlarged axial cross-sectional view of the device seen in FIG. 1 such as taken on the line 2—2 thereof.

FIG. 3 is a transverse cross-sectional view of the device as shown in FIG. 2 taken on the line 3—3 thereof.

FIG. 4 is a cross-sectional view of the lower portion of the device as seen in FIGS. 2 and 3, such as indicated by the line 4—4 of FIG. 3, showing parts in elevation for clear illustration, and showing an uneven workpiece with the electrodes in adjusted axial position to compensate therefore.

FIG. 5 is a perspective view of a piston from its radially outer side; and

FIG. 6 is a perspective view of the piston of FIG. 5 from its radially inner side.

Referring now to the drawings wherein like numerals refer to like and corresponding parts throughout the several views, the novel compensating triple electrode holder shown therein to illustrate the invention comprises, a body 10 having a head 11 surmounted by a shank 12 for securing the holder on a welding machine, not shown. The body 10 has an internal cavity and a threaded annular flange 14 which interfits with the threaded nose 15 of the head 11. A neck 16 projects downwardly from the nose 15 of the head 11. The body has a cam chamber 18 below the neck 16. A cam 17 lies in the cam chamber 18 and may be frustoconical in shape as shown.

The body 10 has three cylinders 20, 21 and 22 circumferentially or triangulatedly positioned and three pistons 24, 25, 26 disposed respectively therein, FIGS. 3 and 4. Each piston 24—26 has a radially inner cam surface 27, a radially outer relief 28 forming a channel relative to its cylinder, spring receiving indentation 29, a peripheral groove 30 holding the O-ring seal 31, a tapered socket 32 for mounting an electrode 33, a counterbore 34 above the socket 32, a hollow stem 35 mounted in the counterbore 34 lying coaxially in the socket 32, 36 communicating between the hollow stem 35 and the cam surface 27 at the cam chamber 18, an aperture 37 communicating with the socket 32 and the channel 38 formed by the relief 28. The electrode may be hollow and the hollow stem 35 may project into the interior of the electrode 33 as shown.

The body 10 has an annular stop 40 at the bottom of each cylinder 20—22 coacting with an annular shoulder 41 on the pistons 24—26. The stop 40 and shoulder 41 limit the axial projection of the pistons 24—26 outwardly of the body 10. A spring 42 in each indentation 29 urges the pistons 24—26 axially outwardly as limited by the shoulder 41 and stop 40.

The head 11 has a central bore 50 surmounted by a counterbore 51. A tube 52 lies coaxially in the bore 50 and is sealed in the counterbore 51. A threaded aperture 53 in the head 11 communicates with the tube 52 and is equipped with a fitting 54. The neck 16 may be a plug as shown and has a bore as an extension of the bore 50 and a counterbore therebelow sealed on the other end of the tube 52. A chamber 55 thus lies between the tube 52 and the bore 50. A threaded aperture 56 in the head 11 communicates with the chamber 55 and is equipped with a fitting 57. Vent holes 58 in the head 11 such as in the neck 16 communicate with the cylinders 20—22 above the pistons 24—26 and thus with the channels 38. An O-ring seal 60 seals off the cam chamber 18 therebelow. The tube 52 communicates through an aperture 61 in the neck 16 with the cam chamber 18. The cam 17 may have an aperture 62. A spring 63 is fixed in the aperture 61 and lies in the aperture 62 of the cam 17 and urges the cam 17 to a central or axial position. An O-ring seal 64 seals between the body flange 14 and the head 11.

Relative to equalizing action, when the holder is advanced toward a workpiece 70 under uneven ambient conditions, such as shown in FIG. 4, one electrode 33 makes engagement first and its supporting piston 24 backsup in the body 10. In backing into the body 10, the piston cam surface 27 engages and moves the cam 17 transversely. When the next electrode makes engagement with the supporting piston 26 backsup in the body 10 and its cam surface 27 engages and moves the cam 17 transversely. When the third electrode 33 makes engagement with the workpiece 70, its supporting piston 25 backsup in the body and its cam surface 27 engages the cam 17 but cannot move it transversely as it is blocked by its engagement with the other two pistons 24 and 26. Sufficient space is provided for the cam 17 to move upwardly and transversely to allow this action. Upon further advancing movement of the body 10 toward the workpiece 70, the cam 17 in its adjusted transverse position comes into engagement with the neck 16. This stops upward movement of the cam 17 and blocks further backup movement of the pistons 24—26. The pistons 24—26 are now in their adjusted positions to compensate for the differences encountered in the elevation of the workpiece 70. Upon further advancing movement of the holder, the electrodes in their adjusted position are forced into substantially equal mechanical engagement, force and electrical contact with the workpiece. Thus each electrode is in a substantially equal electrical conducting path. Thus upon the application of power, the current travels substantially equally at each electrode to make substantially equal welds.

In so adjusting the electrodes 33 relative to the ambient conditions at the workpiece 70, the cam surfaces 27 of the pistons 24—26 lie at different elevations or levels relative to each other and to the cam 17. Thus the cam 17 contacts the cam surfaces 27 of each piston 24—26 at a different rise point on each cam surface 27. The cam 17 thus takes a compensating position off axial center between the piston 24—26 and this allows the pistons 24—26 to lie at positions of different axial projection. The cam 17 is also allowed to rise slightly in conjunction with the inward movement of the pistons before effecting blocking action and this insures that all three electrodes 33 are in engagement with the workpiece 70 prior to blocking further inward movement of the pistons 24—26.

It can now that the holder device allows the first engaging electrode 33 to move its piston 24—26 inwardly, the second engaging electrode 33 to move its piston 24—26 inwardly during continuing inward movement of the first piston, and the third engaging electrode 33 to move its piston 24—26 inwardly during continuing inward movement of the first and second pistons. It can also be seen that the cam 17 is engaged and shifted transversely by the first piston toward the other two, then is engaged by the second piston and shifted transversely by both engaging pistons toward the third piston, and then is engaged by the third piston. The cam 17 and pistons 24—26 are now all in engagement with cam 17 lying offcenter in engagement with different rise points on their cam surfaces 27. Upon further inward movement of the pistons 24—26 the cam 17 is elevated by all three pistons 24—26 into engagement with the neck 16. This blocks further inward movement of the pistons 24—26 as the cam 17 is elevated by all three pistons 24—26 into engagement with the neck 16. This blocks further inward movement of the pistons 24—26 as the cam 17 is jammed therebetween. The electrodes 33 are now in substantially equal engagement with the workpiece 70 and the parts are jammed in relatively solid electrical contact. Upon further movement of the holder, the electrodes are forced in substantial equal engagement and exerted force with the workpiece 70.

Upon the welds being made, the holder device is moved back from the workpiece 70 and the springs 42 at each piston 24—26 urge them axially outwardly to their position in the cam chamber 18 which readies the device to make the next welds.

Referring now to the cooling system of the holder device, coolant fluid fed into the device through the fitting 54 enters the aperture 53 and tube 52 and emits through the counterbore 61 into the cam chamber 18. Here the coolant fluid travels around the cam 17 and through its central aperture 62 if it is so equipped. The coolant fluid flows from the cam chamber 18 through the aperture 36 to the hollow stem 35 of each piston 24—26 and emits at the electrode 33. The coolant fluid then travels back through the socket 32 to the aperture 37 and channel 38 formed by the relief 28 on each piston 24—26. The coolant fluid travels from each channel 38 through the cylinders 20—22 above the pistons to the vent holes 58 in the head 11 to and through the chamber 50 to the orifice 56 and fitting 57, where it emits from the holder device. In the event coolant fluid is fed at the fitting 57 the flow is reverse to that described above and emits at the fitting 54.

While only a single preferred embodiment of the invention has been shown and described in detail, it is obvious that many changes may be made in the size, shape, detail, spacing, travel, and arrangement of the various elements of the invention within the scope of the appended claims.

I claim:
1. An electric resistance welding electrode holder for holding three electrodes which is capable of substantially equalizing the force of mechanical engagement of each electrode with the workpiece relative to the other two electrodes to compensate for differing ambient conditions at the workpiece so as to make substantially equal electrical contact with the workpiece to effect substantially equal welds, comprising:
   a body having three cylinders located circumferentially;
   a piston in each said cylinder having an inner end within said body and an outer end projecting beyond said body;
   said piston outer ends having sockets for mounting electrodes therein;
   said pistons adjacent said inner ends having a relief at an angle radially and axially forming an upwardly facing cam surface;
   said body having an axial bore forming a cam chamber at said cam surfaces of said pistons;
   a floating cam in said cam chamber having a downwardly facing surface in working relationship with said cam surfaces on said pistons for intercoaction therebetween;
   a head on said body having a neck extending axially into said body spaced slightly above said cam for abutting said cam to limit its upward movement;
   said cam being radially shiftable between said pistons to allow engagement between said cam and said cam surfaces on said pistons at different rise points on said piston cam surfaces to permit different axial projection of said pistons relative to said body;
   in advancing movement of said body toward a workpiece with said pistons having electrodes in their said sockets, upon one electrode on one said piston engaging the workpiece, said one piston being moved axially inwardly of said body with its said cam surface camming against said cam and displacing it transversely in said cam cavity toward said other pistons and establishing engagement on said one piston at a higher point on its said cam surface due to the axial inward movement of said one piston;
   upon another electrode on a second of said pistons engaging the workpiece, said second piston being moved axially inwardly of said body with its said cam surface camming against said cam and displacing it transversely toward the third said piston and establishing engagement on said second piston at a higher point on its said cam surface due to the axial inward movement of said second piston;
   upon the electrode on the third said piston engaging the workpiece, the third said piston being moved axially inwardly of said body with its said cam surface camming against said cam which is now blocked against transverse movement by the one and second said pistons cam surface engagement therewith;
   said cam then being jammed between said cam surfaces of said pistons preventing further axially inward movement of said pistons relative to one another;
   said cam being also jammed against said neck projection on said head; and
   said cam then preventing further axial inward movement of said pistons in their axial extension adjusted positions relative to the differing ambient conditions of the workpiece so that upon further advancing movement of said body the electrodes are moved into substantially equal mechanical force engagement with the workpiece to make substantially equal electrical contact therewith to make substantially equal welds.